Figure 9:
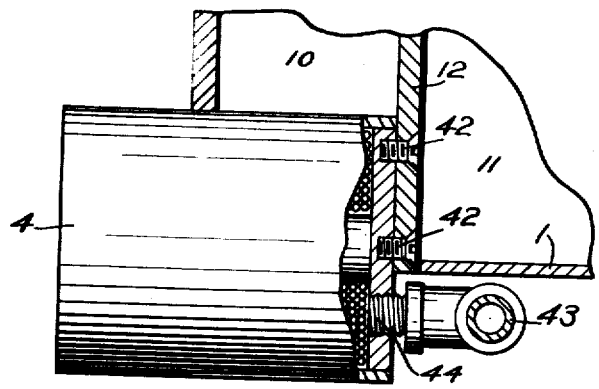

D. W. HIVELY.
APPARATUS FOR SECURING LINES TO SUNKEN VESSELS.
APPLICATION FILED JUNE 3, 1915.
1,202,519.
Patented Oct. 24, 1916.
6 SHEETS—SHEET 1.
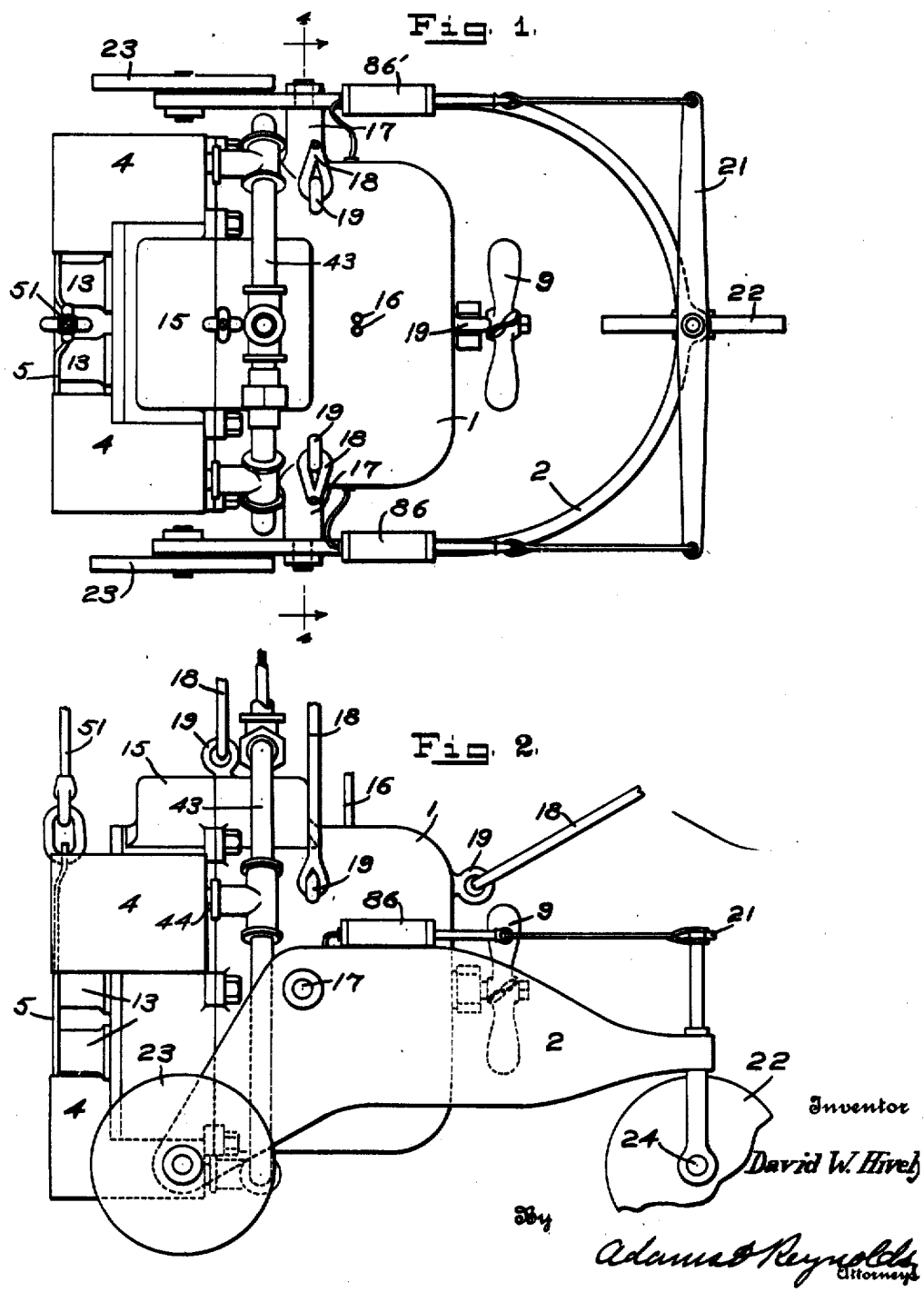

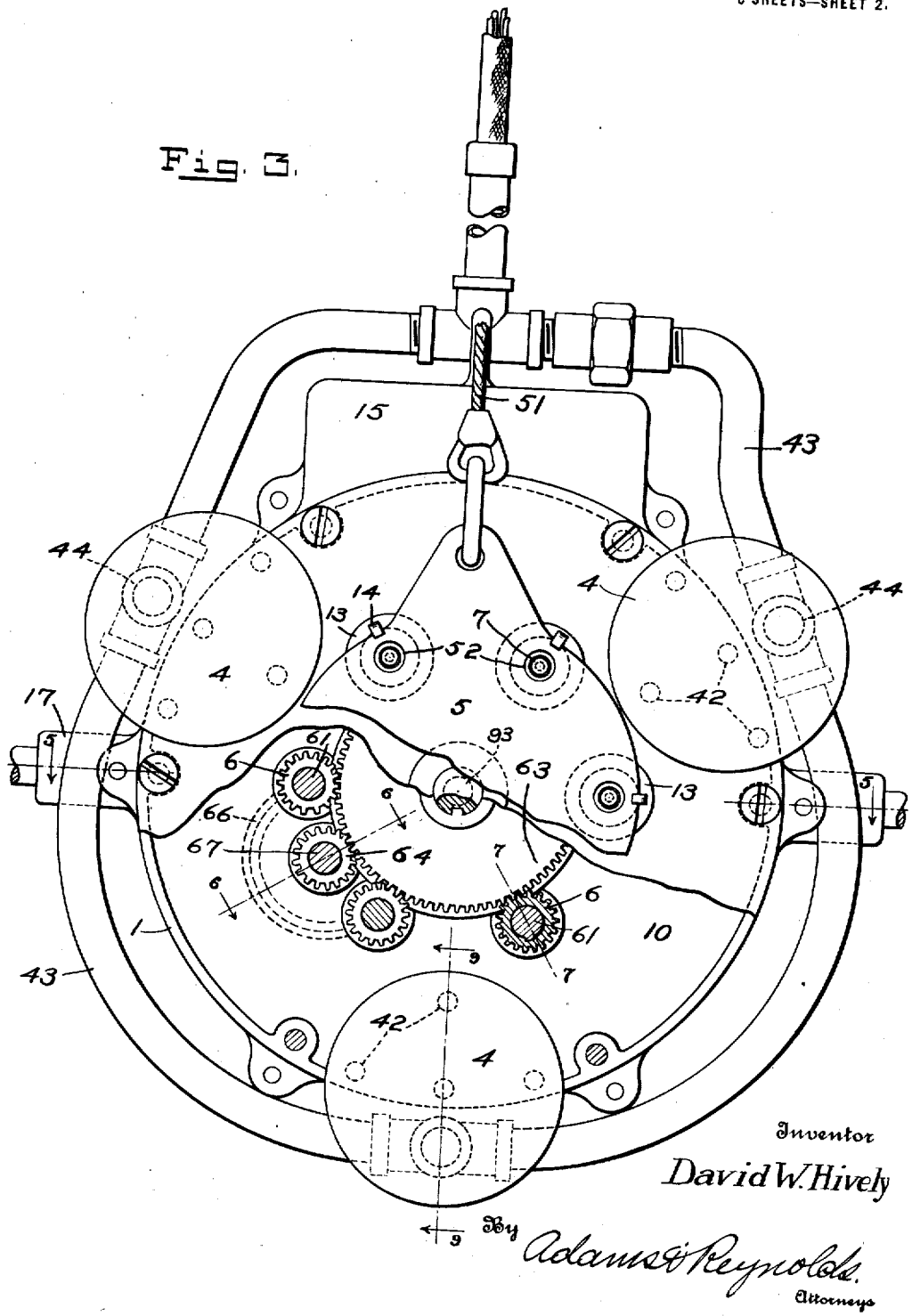

D. W. HIVELY.
APPARATUS FOR SECURING LINES TO SUNKEN VESSELS.
APPLICATION FILED JUNE 3, 1915.
1,202,519.
Patented Oct. 24, 1916.
6 SHEETS—SHEET 3.
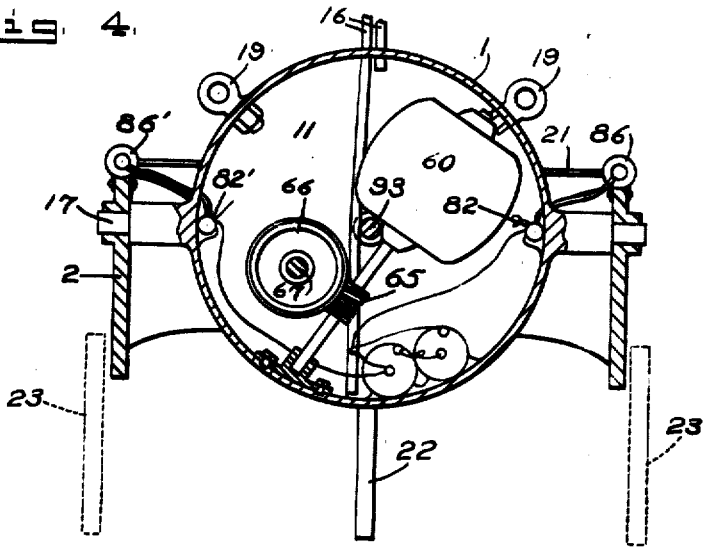
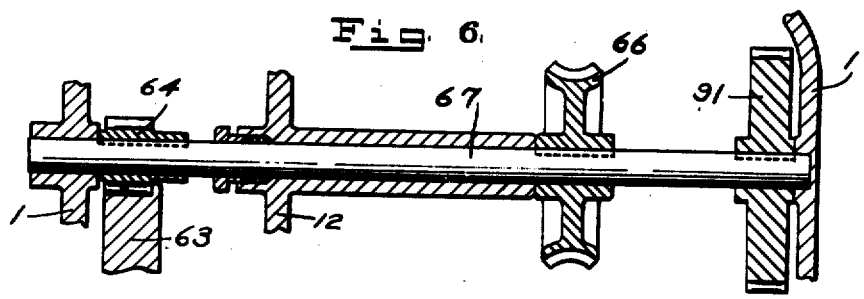
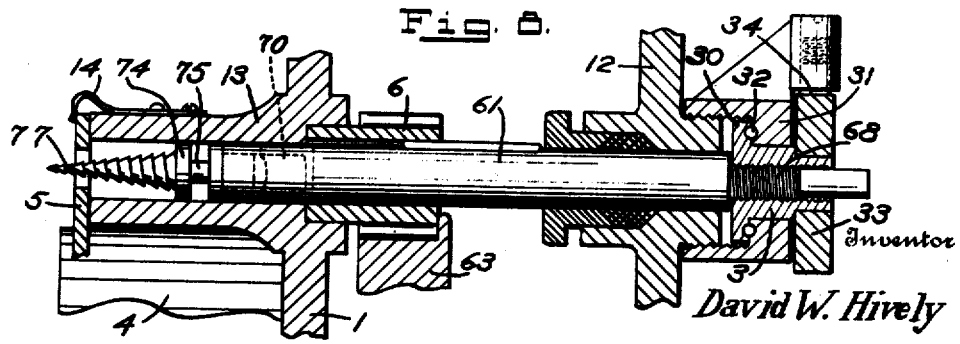
Inventor
David W. Hively
By Adams & Reynolds
Attorneys

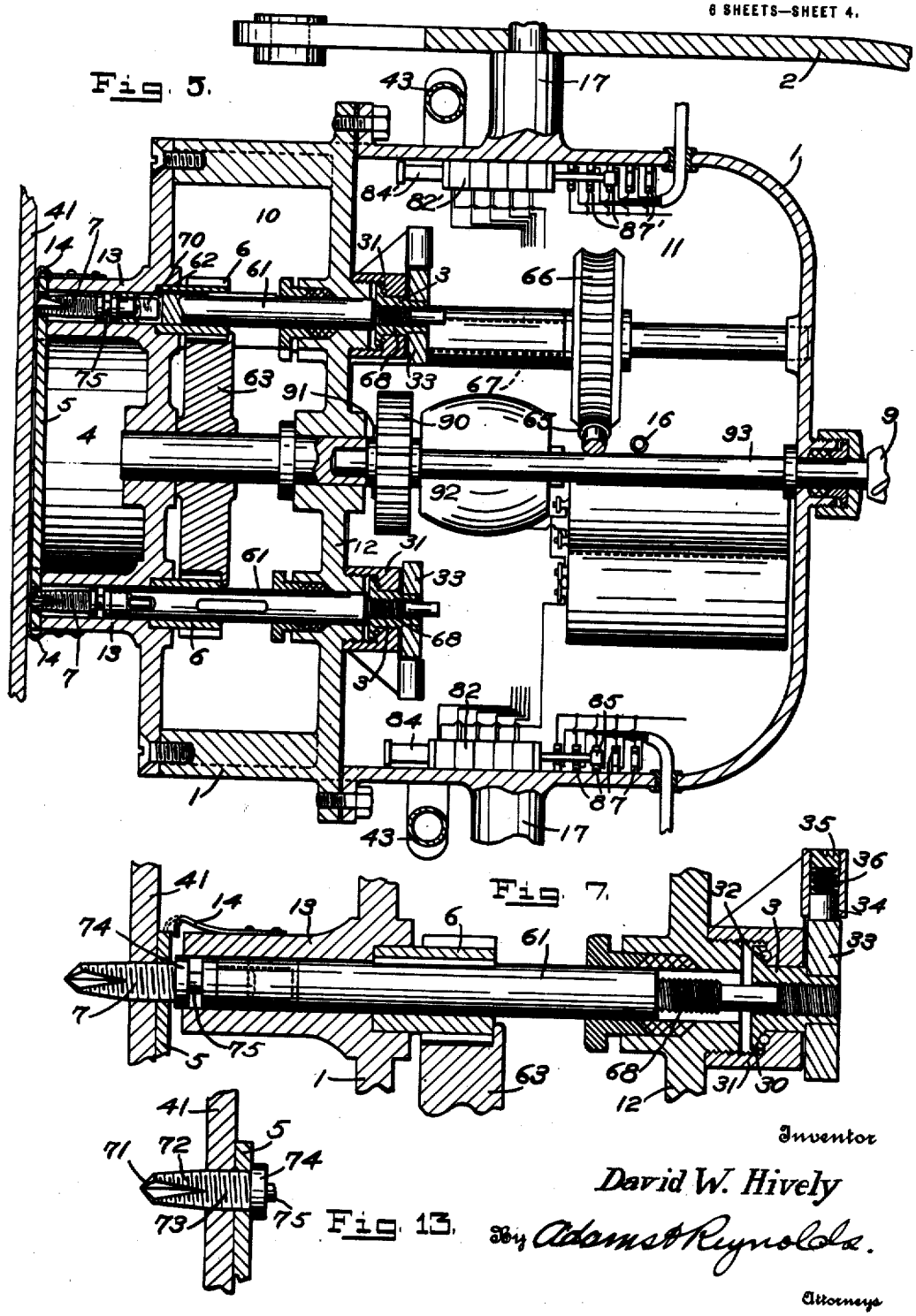

D. W. HIVELY.
APPARATUS FOR SECURING LINES TO SUNKEN VESSELS.
APPLICATION FILED JUNE 3, 1915.

1,202,519.

Patented Oct. 24, 1916.
6 SHEETS—SHEET 5.

Inventor
David W. Hively

By Adams & Reynolds
Attorneys

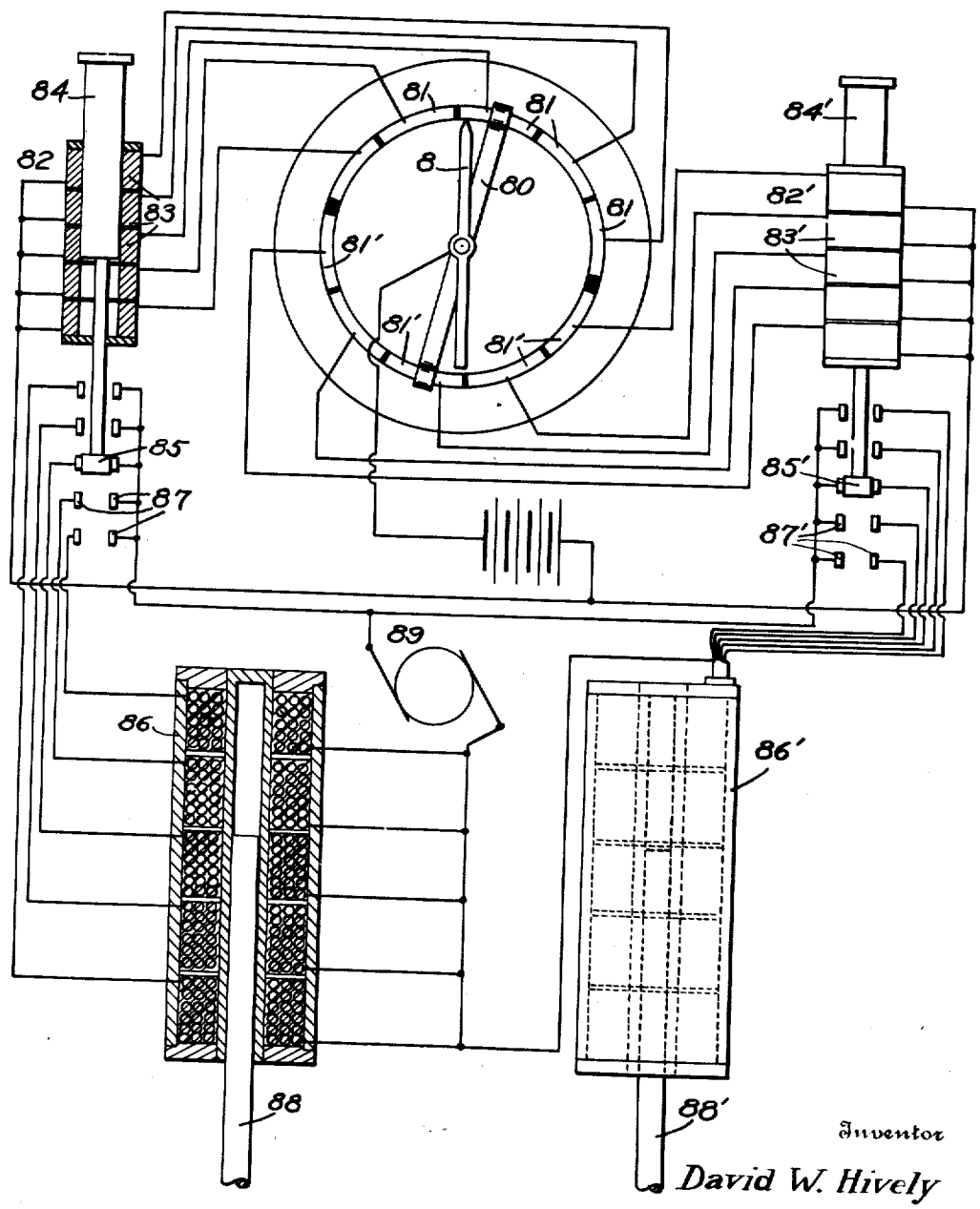

UNITED STATES PATENT OFFICE.

DAVID W. HIVELY, OF SEATTLE, WASHINGTON, ASSIGNOR OF ONE-HALF TO ENOS B. CADE, OF SEATTLE, WASHINGTON.

APPARATUS FOR SECURING LINES TO SUNKEN VESSELS.

1,202,519.     Specification of Letters Patent.      Patented Oct. 24, 1916.

Application filed June 3, 1915. Serial No. 31,839.

*To all whom it may concern:*

Be it known that I, DAVID W. HIVELY, a citizen of the United States, and resident of Seattle, in the county of King and State of Washington, have invented certain new and useful Improvements in Apparatus for Securing Lines to Sunken Vessels, of which the following is a specification.

My invention comprises a device by means of which a line or lines may be secured to a sunken vessel, without the necessity of a diver descending to the vessel, to thereby raise the vessel. I have therefore called my device an apparatus for securing lines to sunken vessels.

The object of my invention is to provide a device which will locate a sunken vessel, automatically direct itself toward the vessel, and which will operate at any depth to attach lines to the vessel, thus doing away with the danger and uncertainty, and in some cases overcoming the impossibility, of sending down a diver.

My invention comprises the novel parts and combinations of parts which are shown in the drawings, and which will be hereinafter described in the specification and more particularly pointed out in the claims terminating the same.

In the accompanying drawings I have shown my invention in the form which is now preferred by me.

Figure 10:
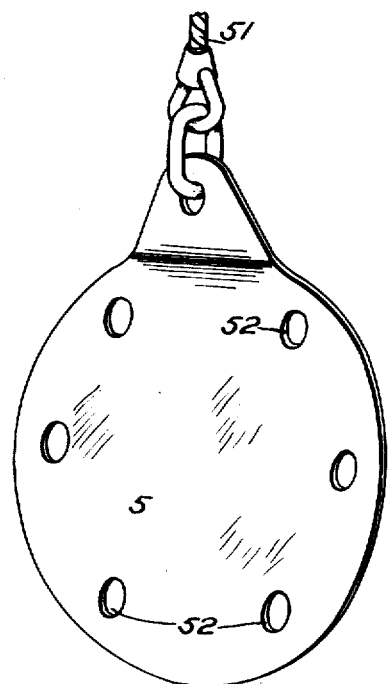
Figure 12:
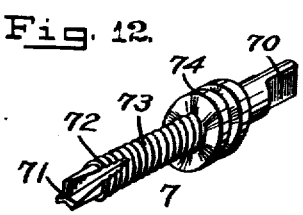

Figure 1 is a top plan view of my invention, parts of the upwardly extending supports and leads being shown in section. Fig. 2 is a side elevation of my device. Fig. 3 is a front elevation of my device, parts thereof being broken away to show the interior construction. Fig. 4 is a vertical section taken approximately on the line 4—4 of Fig. 1. Fig. 5 is a horizontal section taken on line 5—5 of Fig. 3. Fig. 6 is a section on line 6—6 of Fig. 3, illustrating the auxiliary driving shaft and its connections. Fig. 7 is a section on line 7—7 of Fig. 3, illustrating one of the drill shafts and the screw-feed mechanism. Fig. 8 is a section similar to Fig. 7, showing a screw adapted to be used in attaching lines to wooden vessels. Fig. 9 is a section on line 9—9 of Fig. 3, illustrating the construction of the electromagnets. Fig. 10 is a perspective view of the plate which is to be secured to the vessel. Fig. 11 is a diagram and plan of the magnetic controlling and guiding mechanism. Fig. 12 is a perspective view of one of the drilling and tapping bolts. Fig. 13 is a section through the hull of a vessel and the plate which is secured thereto, showing the manner of securing the plate to the vessel.

It is quite difficult to locate a sunken vessel, though its approximate location may be well-known. Having once located a vessel, it is often impossible to secure a line to the vessel, owing to the depth of water, and the consequent danger of sending down a diver. Even with exact knowledge of the position of a sunken vessel, it is an expensive and slow process to employ divers for making lines fast thereto. These difficulties may be overcome by the use of the present device, which is adapted to locate the vessel, attach itself thereto, and then bolt a plate to the vessel, this plate having a hoisting line attached. After a sufficient number of these lines have been attached, the vessel may be raised by any of the usual means. This can be accomplished at any depth, and the device can be operated from the surface, without the necessity of sending down a diver.

My device comprises a casing 1, mounted upon carriage 2. Within, the casing is divided into an outer chamber 10 and a watertight inner chamber 11. A water-tight control chamber 15 is also provided within the casing, as will be later described.

Projecting forwardly from the casing are several electromagnets 4, there being three of these shown in the drawings. These electromagnets are sufficiently powerful to attract the device to the hull of a ship, when brought to within a short distance thereof, and will anchor the device against the hull while energized. It is assumed that the vessel is of steel construction, which is true of nearly all. These magnets 4 are preferably placed about the periphery of casing 1, with their axes in the same direction as the casing. They may be secured to the casing in any suitable manner, as by screws 42 passing through partition 12 between the inner and outer chambers 11 and 10. A pipe 43 extending about the casing 1, connects with each magnet at 44, and carries the electric leads, thus keeping all connections watertight.

Projecting forwardly from the casing in the same direction as the magnets 4, are a number of lugs 13. These lugs are preferably arranged in a circle, and project from the casing to a distance slightly less than the projection of the magnets 4. A plate 5, having a stout hoisting line 51 attached thereto, is secured upon the outer ends of lugs 13 in any suitable manner, as by spring clips 14.

Each of the lugs 13 is axially bored for the reception of a drill shaft 61. This shaft is provided with a socket 62 at its outer end, adapted to receive the flattened end 70, of a drilling and tapping bolt 7, to thereby rotate said bolt 7 when desired. Shaft 61 is keyed in pinion 6, but is adapted to move axially therein to feed the bolt 7 forward. Pinions 6 are rotated by gear 63, which is in turn driven by pinion 64, which is driven from the motor 60 through any suitable means, as by worm 65, gear 66 and shaft 67, carrying the pinion 64. This mechanism is set in motion from the surface after the casing has been clamped to the hull by magnets 4.

Drilling and tapping bolts 7 are preferably made of hardened steel, and are formed at their outer end, 71, as a drill, as shown in Fig. 12. Just back of this threads are cut, as at 72, forming, in effect, a tap for cutting threads in the hole bored in the hull. These threads are continued, as shown at 73, and serve to secure the drill in the hull. Drill 7 is, in effect, a combined drill, tap and bolt. It is provided with a suitable head, as 74.

Any suitable mechanism may be used for feeding in the bolt 7. As shown, the inner end of drill shaft 61 is threaded, as shown at 68. A nut 3 is threaded thereon, and is normally adapted to rotate with the shaft 61. Nut 3 is provided with a flange 30, bearing against a stationary member 31. Balls 32 may be used to lessen the friction between these two members. A disk 33 is forced upon the outer end of, and rotates with, nut 3. A spring-pressed plunger 34, bears upon the periphery of disk 33, and tends to retard the disk and nut 3. A screw 35, may be used to regulate the tension upon spring 36. See Figs. 7 and 8.

When the drill point 71, of the drilling and tapping bolt 7, is bearing upon the hull of a vessel, there is sufficient friction produced between the threads of the screw 68 and the nut 3, to overcome the retarding action of plunger 34. The nut 3 then turns with the shaft 61, and does not feed the bolt 7 forward. Whenever the drill point 71 has cut away a little metal, the friction between the threads is lessened, and the plunger 34 retards the nut 3, causing the shaft 61 to feed forward until the drill point again bears with full force upon the hull, and the friction between the threads again overcomes the retarding effect of plunger 34. Practically, this retarding and feeding action is going on all the time the drilling and tapping bolt 7 is in operation, as it is continually cutting away the metal of the hull. Nut 3 rotates at a speed only slightly less than shaft 61, and feeds the drill 7 forward just the right amount.

The plate 5, mounted upon the lugs 13, as described, has holes 52 bored to register with the axial bore of said lugs. Bolts 7 project therethrough, and when drawn into the hull they draw plate 5 from the clips 14, and head 74 clamps the plate to the hull. Just back of head 74 is a reduced neck 75. Shaft 61 continues to rotate after the plate 5 has been bolted tight, and the bolt 7 cannot then be turned. In consequence the neck 75 is broken off, the bolt remaining in the hull, and securing the plate 5 thereto, while the casing is released, and may be drawn to the surface. This leaves plate 5 securely fastened to the hull, with a line 51 to the surface. When sufficient number of these plates 5 have been attached to the vessel, it can then be raised to the surface by any suitable means.

In Fig. 8 I have shown a modification which may be used to secure the plate 5 to a wooden vessel. Instead of the drill point 7, I employ a sharp-pointed wood-screw 77, which engages the hull and is screwed in by the shaft 61.

To propel the device through the water toward a vessel I employ a propeller 9, which may be driven by any suitable means. I have shown this propeller as driven by shaft 93, upon which is mounted a gear 90, meshing with a gear 91, connected to a motor 92. I may employ only one motor to drive both the drills and propeller, connecting them by any suitable clutch mechanism.

To locate a vessel from a distance I employ a sensitive magnetic needle 8, which may be adjusted to equalize the magnetic attraction of the casing and contained mechanism, and which will be attracted by the vessel, and will point in that direction. A light contact finger 80 is secured to turn with needle 8, and is adapted to complete an electric circuit between each of two switch segments, as 81 and 81', and a battery. These elements are preferably placed in a control chamber 15, located in an upward projection of the casing 1, and approximately in the center thereof.

The solenoids 82 and 82' are placed in the circuit of the switch and the battery. These solenoids are divided into several sections 83 and 83', each section connecting with its individual switch segment 81 and 81' respectively. Thus when the needle 8 is greatly deflected, contact is made with one of the last segments 81 and 81', and the cores 84 and 84' of the solenoids are drawn to an extreme outer section 83 for one, and an extreme inner section 83' for the other.

Contact members 85 and 85' are mounted upon one end of cores 84 and 84', respectively, and serve to complete the circuit of solenoids 86 and 86', respectively, through points 87 and 87'. These solenoids 86 and 86' are also divided into sections corresponding to the sections 83 and 83' of solenoids 82 and 82'. The cores 88 and 88' of these solenoids are connected to a tiller 21, which controls a rudder 22 to thereby direct the device toward a vessel which attracts the needle 8. Solenoids 82 and 82' might be used to control the tiller 21 direct, but I prefer to use them to control solenoids 86 and 86', which are energized by a stronger current from the surface, as by a generator 89, as shown in Fig. 11.

It is desirable that the inner chamber 11 and the control chamber 15 be kept dry and water-proof. It is also desirable that the pressure within these chambers should be approximately equal to the liquid pressure outside the casing. To secure both of these ends I may employ a pair of small tubes 16, which project into the chamber 11. Air is supplied through one of these tubes, of sufficient pressure to counteract the outside pressure. The other tube 16 extends to the bottom of the chamber, and serves to draw off any water which may leak into the compartment.

As it may be necessary, at times, for the casing to be drawn along on the ocean floor, I have shown it as mounted upon a carriage 2, pivotally secured upon the casing by lugs 17, and provided with wheels 23 at each side of the casing. The rudder 22 is also formed as a wheel, pivoted at 24, and provides a third point of support. To guide and support the casing from above I employ various lines 18, secured to eyes 19, as shown in the drawings.

Having now described my invention, what I desire to claim and secure by Letters Patent of the United States is:

1. A device of the character described comprising means operable from the surface for positively securing a hoisting element directly to a submerged vessel.

2. A device of the character described, comprising means operable from the surface for securing a plate having a line attached thereto, directly upon a submerged vessel.

3. A device of the character described, comprising means operable from the surface for bolting a plate having a line attached thereto, directly upon a submerged vessel.

4. A device of the character described comprising, in combination, means operable from the surface for positively securing a line to a submerged vessel, and means carried by the device for anchoring the device to the vessel only while said line is being secured in place.

5. A device of the character described, comprising, in combination, means operable from the surface for bolting a plate having a line attached thereto to the hull of a submerged vessel, and magnetic means for holding the device to the hull only while said plate is being bolted in place.

6. A device of the character described comprising, in combination, means operable from the surface for bolting a plate having a line attached, to the hull of a submerged vessel, means for propelling the device, means for directing the device toward a vessel, and magnets for securing the device to the vessel while said plate is being bolted in position.

7. A device of the character described, comprising, in combination, a plurality of drilling and tapping bolts, means controlled from the surface to turn said bolts, whereby a hoisting attachment may be bolted to the vessel, and magnets for securing the device to the hull of a vessel only while the hoisting attachment is being bolted to the vessel.

8. A device of the character described, comprising, in combination magnets for attaching the device to a vessel, a plurality of drilling and tapping bolts, means controlled from the surface to turn said bolts, whereby a plate having a line attached may be secured to the vessel, means for propelling said device, and means for locating said vessel and directing the device to the vessel.

9. In a device of the character described, in combination, means for propelling the device, a magnetic compass, means controlled by said compass for directing the device toward a sunken vessel, means for holding the device against the vessel, a plurality of drilling and tapping bolts, and means for turning said bolts, whereby a plate having a line attached, may be secured to the vessel.

10. In a device of the character described, in combination, means for propelling the device, a magnetic compass, means controlled by said compass for directing the device toward a sunken vessel, means for holding the device against the vessel, a plurality of drilling and tapping bolts, means for turning said bolts, whereby a plate having a line attached may be secured to the vessel, and an automatic drill feeding mechanism controlled by contact of the drills with the vessel.

11. In a device of the character described, in combination, means for propelling the device, a magnetic compass, means controlled by said compass for directing the device toward a sunken vessel, means for holding the device against the vessel, a plurality of drilling and tapping bolts, means for turning said bolts, whereby a plate having a line attached may be secured to the vessel, and an automatic screw-feed mechanism for forcing said drills into the vessel controlled by contact of the drills with the vessel.

12. Means for securing a plate to the hull of a vessel comprising a plurality of drilling and tapping bolts, means for turning said bolts, whereby the plate may be bolted to the hull, and a screw-feed mechanism therefor comprising a nut normally adapted to rotate with the drill, and means tending to retard said nut.

13. Means for securing a plate to the hull of a vessel comprising a plurality of drilling and tapping bolts, means for turning said bolts whereby the plate may be bolted to the hull, and a screw-feed mechanism therefor comprising a nut normally adapted to rotate with the drill, a disk secured upon said nut, and a plunger bearing upon said disk and adapted to retard said nut.

14. Means for securing a plate to the hull of a vessel comprising a plurality of drilling and tapping bolts, means for turning said bolts whereby the plate may be bolted to the hull, and a screw-feed mechanism therefor comprising a nut normally adapted to rotate with the drill, a disk secured upon said nut, a spring-pressed plunger bearing upon said disk, and means to regulate the tension upon said plunger.

15. Means for securing a plate to the hull of a submerged vessel comprising a plurality of drilling and tapping bolts, rotative shafts provided with bolt-engaging means, said shafts being threaded, a nut mounted upon the threaded portion of each of said shafts and normally adapted to turn therewith, and means for retarding said nuts whereby the bolts are gradually fed into the hull of the vessel.

16. Means for securing a plate to the hull of a vessel comprising a plurality of drilling and tapping bolts, means for rotating said bolts, whereby said plate may be secured to the hull, said bolts having a reduced portion near their securing end, and a feeding mechanism for feeding said bolts into the hull of the vessel.

17. A drilling and tapping bolt comprising a pointed drill portion, a threaded tapping portion, a threaded securing portion, a head, and a reduced portion just outside of said head.

18. A drilling and tapping bolt comprising a pointed drill portion, a threaded tapping portion, a threaded securing portion, and a flattened portion at the end opposite to the drilling point.

19. A drilling and tapping bolt having a drilling point at one end, a tapping portion adjacent thereto, a threaded securing portion, a flattened portion at the end opposite to the drilling point, and a reduced portion between said flattened portion and the securing portion.

20. A boring mechanism, a mechanism carried thereby for propelling it through the water, and magnetically controlled steering mechanism therefor.

21. A boring mechanism, an electric motor for operating the same, a propeller which is operated by a separate electric motor, a magnetically controlled steering device and electromagnetic means for anchoring it against the face of a vessel.

22. The combination with a casing having journaled therein a series of rotative shafts, each provided with means for securing thereto a drilling and tapping bolt, an electric motor and means for turning said shafts therefrom, means for supporting a line-securing member in front of said bolts, and means for holding said device to the face of a vessel while securing the bolts therein.

23. The combination with a casing having journaled therein a series of rotative shafts, each provided with means for securing thereto a drilling and tapping bolt, an electric motor and means for turning said shafts therefrom, means for supporting a line-securing member in front of said bolts, and means for holding said device to the face of a vessel while securing the bolts therein, said casing having means for attaching suspending lines thereto.

24. The combination with a casing having journaled therein a series of rotative shafts, each provided with means for securing thereto a drilling and tapping bolt, an electric motor and means for turning said shafts therefrom, means for supporting a line-securing member in front of said bolts, means for holding said device to the face of a vessel while securing the bolts therein, and wheels mounted on said casing and adapted to contact with the sea floor.

25. The combination with a casing having journaled therein a series of rotative shafts, each provided with means for securing thereto a drilling and tapping bolt, an electric motor and means for turning said shafts therefrom, means for supporting a line-securing member in front of said bolts, means for holding said device to the face of a vessel while securing the bolts therein, and wheels mounted on said casing in planes substantially parallel the axes of the drill-carrying shafts and adapted to engage the sea floor.

26. The combination with a casing having journaled therein a series of rotative shafts, each provided with means for securing thereto a drilling and tapping bolt, an electric motor and means for turning said shafts therefrom, means for supporting a line-securing member in front of said bolts, means for holding said device to the face of a vessel while securing the bolts therein, wheels mounted on said casing in planes substantially parallel the axes of the drill-carrying shafts and adapted to engage the sea floor, and a third wheel mounted in a frame having a vertical pivot connection with the casing, and means for automatically turning said wheel carrying frame to thereby steer the device.

Signed at Seattle, Washington, this 7th day of May, 1915.

DAVID W. HIVELY.